United States Patent [19]
Haskell

[11] Patent Number: 5,255,467
[45] Date of Patent: Oct. 26, 1993

[54] HYDRODYNAMIC FISHING SINKER

[76] Inventor: Robert K. Haskell, 825 Wikiup Dr., Santa Rosa, Calif. 95403

[21] Appl. No.: 914,393

[22] Filed: Jul. 17, 1992

[51] Int. Cl.$^5$ .................................... A01K 91/00
[52] U.S. Cl. .................... 43/43.13; 43/42.22
[58] Field of Search ............ 43/43.13, 43.12, 42.22, 43/9.7

[56] References Cited

U.S. PATENT DOCUMENTS

| | | | |
|---|---|---|---|
| 1,266,311 | 5/1918 | Phinney | 43/42.22 |
| 2,062,718 | 12/1936 | Kallberg | 43/43.13 |
| 2,836,002 | 5/1958 | Miller | 43/43.13 |
| 2,883,787 | 4/1959 | Dahl | 43/42.22 |
| 3,466,787 | 9/1969 | Collins | 43/43.13 |
| 3,643,370 | 2/1972 | Cook et al. | 43/43.13 |
| 3,755,955 | 9/1973 | Saia | 43/43.13 |
| 3,808,727 | 5/1974 | Flanders | 43/43.13 |
| 3,844,059 | 10/1974 | Weber | 43/43.13 |
| 3,898,759 | 8/1975 | Jensen | 43/43.13 |
| 3,908,299 | 9/1975 | Kalaerer | 43/43.13 |
| 3,940,872 | 3/1976 | Weber | 43/43.13 |
| 4,282,672 | 8/1981 | Neary | 43/43.13 |
| 4,567,687 | 2/1986 | Even et al. | 43/43.13 |
| 4,581,842 | 4/1986 | Kalberer | 43/43.13 |
| 4,876,820 | 10/1989 | Vann | 43/43.13 |
| 4,940,872 | 7/1990 | Futamura | 219/69.13 |

Primary Examiner—Kurt C. Rowan
Assistant Examiner—Chuck Y. Mah
Attorney, Agent, or Firm—Shlesinger Arkwright & Garvey

[57] ABSTRACT

A hydrodynamic fishing sinker attached to a fishing line and leader to which a lure is connected. The sinker comprises a plate member having upper and lower surfaces, a fin attached to the upper surface at one end thereof, and weights attached to the lower surface at the opposite end thereof. An arm is pivotally connected at one end to the plate member, the opposite end thereof being connected to a fishing line. The arm is movable towards the plate member when the latter assumes a diving attitude. A clip assembly is fixed to one of the plate member surfaces and lockingly engages a latch assembly carried by the arm, to hold the sinker in set position. The clip assembly is disengaged from the latch assembly under force exerted on the arm by a fish striking the lure or by a fisherman pulling on the fishing line.

20 Claims, 4 Drawing Sheets

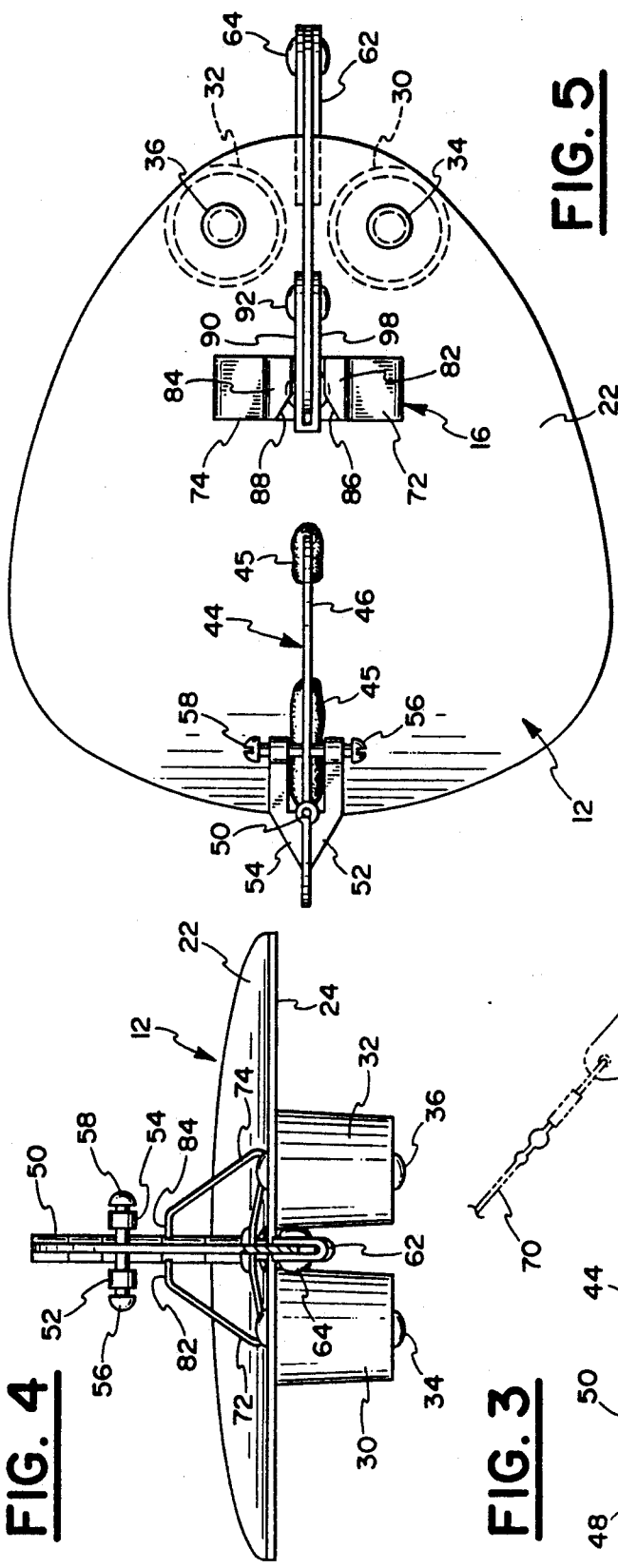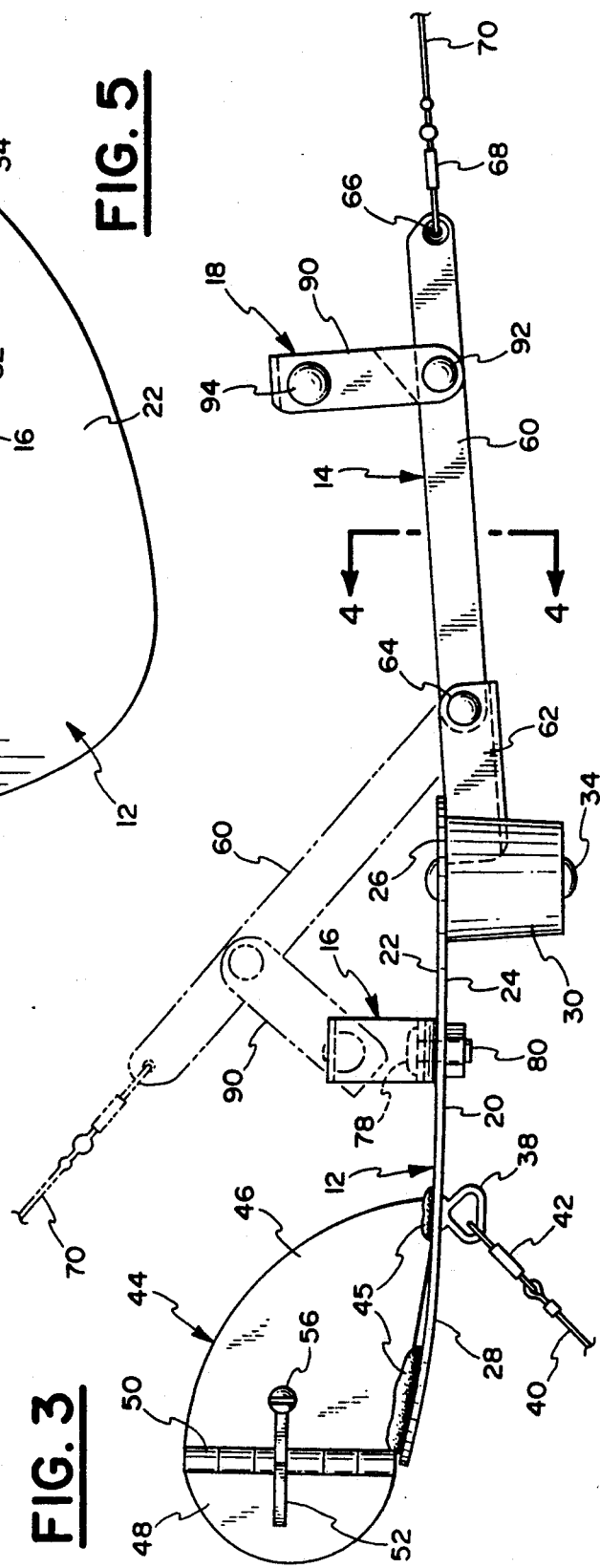

HYDRODYNAMIC FISHING SINKER

BACKGROUND OF THE INVENTION

In trolling for fish which are found at various depths, it is conventional practice to use diving sinkers for carrying the fish bait to the desired depths. A number of diving sinkers have been developed which are initially set to assume a diving attitude when pulled through the water to carry the bait to the desired depths. Then, when a fish strikes the bait, the diving sinker changes from the set or diving attitude to an unset or climbing attitude to facilitate reeling in the fish. Examples of such devices are found in U.S. Pat. Nos. 3,643,370, 3,940,872 and 4,567,687. All of these devices require the device to be reset after each fish strike in order that the sinker will assume the diving attitude when placed in the water for trolling.

Other devices have been developed in which the sinker member is automatically reset to assume a diving attitude by various structural means, as illustrated in U.S. Pat. Nos. 3,466,787 and 4,581,842.

SUMMARY OF THE INVENTION

It is an object of the present invention to provide a hydrodynamic fishing sinker for use in trolling, wherein the sinker assumes a diving attitude when drawn through the water, in a set position until the bait carried by the leader attached to the sinker assembly is struck by a fish, at which time the sinker is automatically unset and assumes a climbing attitude to facilitate reeling in the fish.

The hydrodynamic fishing sinker includes a plate member which is attached to a leader and acts as a hydrofoil in the water, the plate member having a fin attached to the upper surface at the aft end thereof, and weight means attached to the lower surface of the forward end thereof to cause the hydrofoil to assume a diving attitude when drawn through the water. An arm is pivotally engaged at one end with the forward end of the hydrofoil, and the opposite end thereof is attached to the fishing line. Latch means are carried by a link attached to an intermediate part of the arm, which latch means has a locking portion adapted to engage a clip means which is attached to the upper surface of the plate member at a point intermediate the length thereof. Locking engagement of the clamp means with the locking means is effected automatically when the plate member is in the diving attitude, due to the pivotal movement of the arm towards the plate member, causing locking engagement of the latch means and the clip means.

The clip means and latch means are automatically disengaged from each other by the force of the fish striking the bait, resulting in a pulling action of the latch means which overcomes the holding force of the clip means.

A portion of the fin of the hydrodynamic sinker may be adjusted to effect movement thereof either in a port or starboard direction from the boat.

DESCRIPTION OF FIGURES OF THE DRAWINGS

FIG. 3 is a side elevational view of the hydrodynamic sinker of the present invention, showing the sinker in unset position in full lines, the sinker being shown in set position in dotted lines;

FIG. 4, is a sectional view taken along the line 4—4 of FIG. 3, looking in the direction of the arrows;

FIG. 5, is a top plan view of the hydrodynamic sinker in set position;

DETAILED DESCRIPTION OF THE INVENTION

Figure 1:
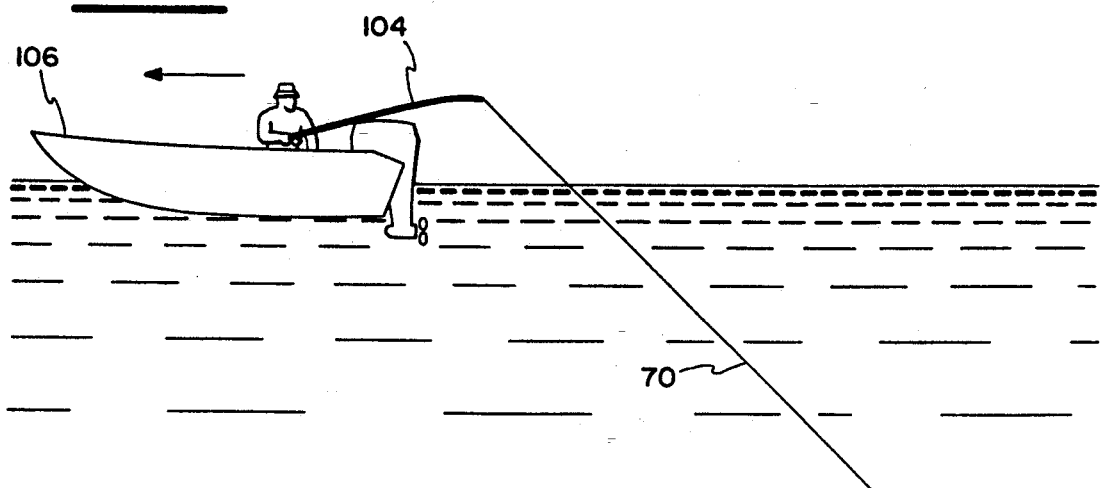
FIG. 1 is a schematic showing the hydrodynamic sinker of the present invention, showing the sinker in the set sequence.

The hydrodynamic sinker of the present invention includes a plate member generally designated 12 which is pivotally engaged at one end with an arm assembly 14. A clip assembly 16 is carried by plate member 12 which is adapted for locking engagement with a latch assembly 18 which is carried by the arm assembly, the latch assembly lockingly engaging the clip assembly upon movement of arm assembly 14 in the direction of the plate member.

Plate member 12 includes a thin plate body 20 which may be of flat configuration, or slightly curved as shown, for better hydrofoil effect. Plate body 20 has upper and lower surfaces 22 and 24 respectively, and forward and aft sections 26 and 28.

A pair of weights 30 and 32 are affixed to the undersurface 24 of forward portion 26 of the plate body by suitable securing means such as rivets 34 and 36, the weights being located on opposed sides of the longitudinal axis of plate 22. An eyelet 38 is secured to lower surface 24 of plate 20, to which a leader 40 is secured by a fastener 42, which eyelet is located in spaced relation to the aft end of plate body 20.

A fin 44 is fixedly secured by welding 45, or other suitable means to upper surface 22 of plate 20 along the longitudinal axis thereof. Fin 44 includes a stationary portion 46 and a movable portion 48 which are hingedly engaged by a hinge member 50. Arms 52 and 54 extend between stationary portion 46 and movable portion 48, one end of each of arms 52 and 54 being fixed to opposite sides of movable portion 48. As shown in FIG. 5, the portions of arms 52 and 54 which extend forwardly towards stationary portion 46 lie in spaced relation thereto. Screws 56 and 58 are threaded through the ends of arms 52 and 54 and engage stationary portion 46. Screws 56 and 58 may be tightened or loosened to effect pivotal movement of movable portions 48 about hinge 50, thereby producing a corresponding movement of the hydrodynamic sinker in a starboard or port direction in the water.

As shown in FIG. 3, arm assembly 14, includes an elongated flat member 60, and a supporting holder 62, of U-shape in cross section. One end of elongated flat member 60 is positioned between the opposed wall portions of holder 62, and pivotally engaged therewith by a rivet 64, or other suitable means. One end of holder 62 is fixed to the lower surface 24 of the forward portion 26 of plate body 20, between weights 30 and 32. The opposite end of elongated flat member 60 is provided with an eyelet 66 which is adapted to receive a fastener 68 attached to a fishing line 70.

Figure 8:
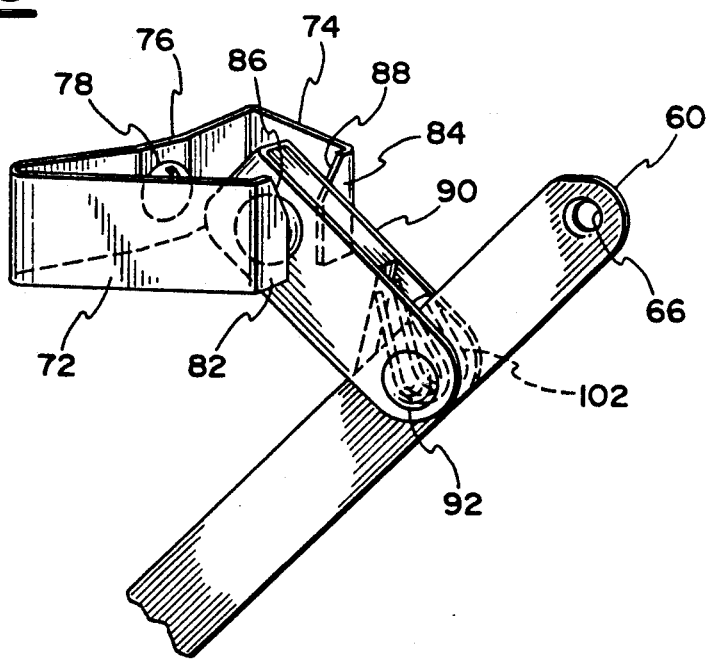
FIG. 8, is an enlarged perspective view of a portion of the present invention illustrating the manner of engagement of the latch assembly with the clip assembly to position the sinker in the set position.

Clip assembly 16 is of generally frusto-conical shape and, as shown in FIGS. 4 and 8, includes a pair of opposed inwardly disposed walls 72 and 74, one end thereof being joined by a bowed connector 76 which is secured to the upper surface 22 of plate 12 by a screw 78 and nut 80, as shown in FIG. 3. The opposite ends of walls 72 and 74 are bent inwardly to provide flanged portions or jaws 82 and 84 which terminate in spaced, opposed relationship as shown in FIG. 4. The upper ends of flange portions or jaw members 82 and 84 are bevelled as indicated at 86 and 88. The clip assembly is preferably made of spring metal or other resilient material, for reasons which will be hereinafter more fully set out. The space between flange portions 82 and 84 may be adjusted by tightening or loosening screw 78 and nut 80 to effect movement of the flange portions towards or away from each other.

Figure 6:
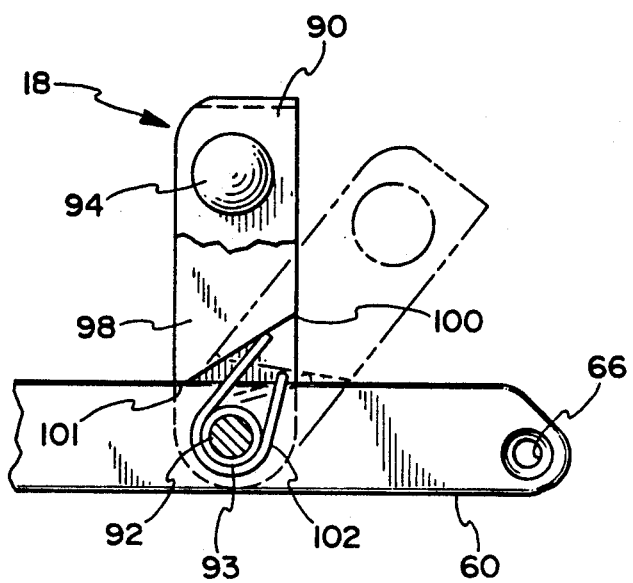
FIG. 6, is an enlarged fragmentary side elevational view of a portion of the hydrodynamic sinker showing to advantage the latch assembly forming a part of the present invention, portions thereof being broken away to disclose details of construction.
Figure 7:
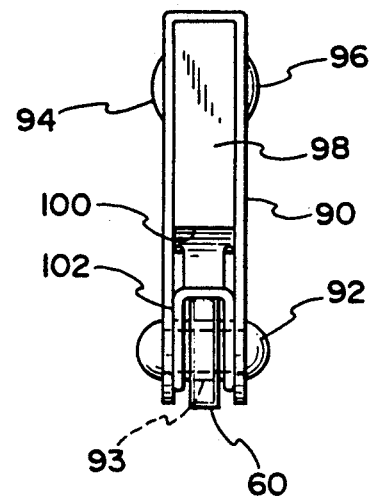
FIG. 7, is an enlarged end view of the latch assembly forming a part of the present invention.

Latch assembly 18 is shown to advantage in FIGS. 6, 7 and 8, and includes a link 90 of inverted U-shape, comprising spaced arms which are in contiguous engagement with opposite sides of elongated member 60. Link 90 is pivotally engaged with arm 60 by a rivet 92 which extends through a spacing bushing 93 which is positioned in an opening in the link, and is of a greater length than the thickness of the link for reasons which will be hereinafter more fully set out. The main body portion of link 90 is of uniform, predetermined thickness to permit the passage thereof through the space between the opposed flange portions 82 and 84 of latch assembly 18.

The end of link 90 remote from pivot means 92 is provided with a pair of outwardly extending dome-shaped protuberances 94 and 96 which normally preclude the passage of that portion of link 90 through the space between flange portions 82 and 84 of clip assembly 16.

As shown to advantage in FIGS. 6 and 7, an insert 98 is placed between the arms of U-shaped link 90 and extends transversely thereof, the lower end of insert 98 being angularly disposed to the link, as indicated at 100. The lower end of insert 98 is flattened at 101 to provide a stop. A spring 102, of generally U-shape, is wrapped around pivotal means 92, and over elongated member 60, the ends thereof being engaged with insert 98, as shown in FIG. 6, to normally urge rotational movement of link 90 to a position at substantially a right angle to member 60, at which point stop 101 engages elongated member 60 to prevent further rotation thereof. As shown by dotted lines in FIG. 6, during the setting operation, link 90 pivots against the tension of spring 102, until the upper end of insert 98 engages the top of arm 60 to prevent further pivotal movement of the link relative to elongated flat member 60.

Spacing bushing 93 is longer than twice the diameter of spring 102 plus the thickness of arm 60, in order to prevent the force of rivet 92 from pressing link 90 against spring 102 which would prevent free rotation of the latch assembly around rivet 92.

In use of the hydrodynamic sinker of the present invention leader 40 is first attached to eyelet 38 by fastener 42, and fishing line 70 is attached to eyelet 66 of flat member 60 by fastener 68. The arm assembly is next placed in the set position shown in dotted lines in FIG. 3 and in FIG. 5, following which it is dropped into the water.

In accordance with the principal objects of this invention the hydrodynamic may be unset and reset while in the water as a convenience to the fisherman to permit him to inspect his line or baited hook. The fisherman can unset the hydrosinker by pulling strongly on the fishing line. He can then reel in the line against only the drag of the unset hydrosinker which is about 3 or 4 ounces of line pull, in contrast to the pull in the set condition of 1½ pounds or more.

Figure 1A:
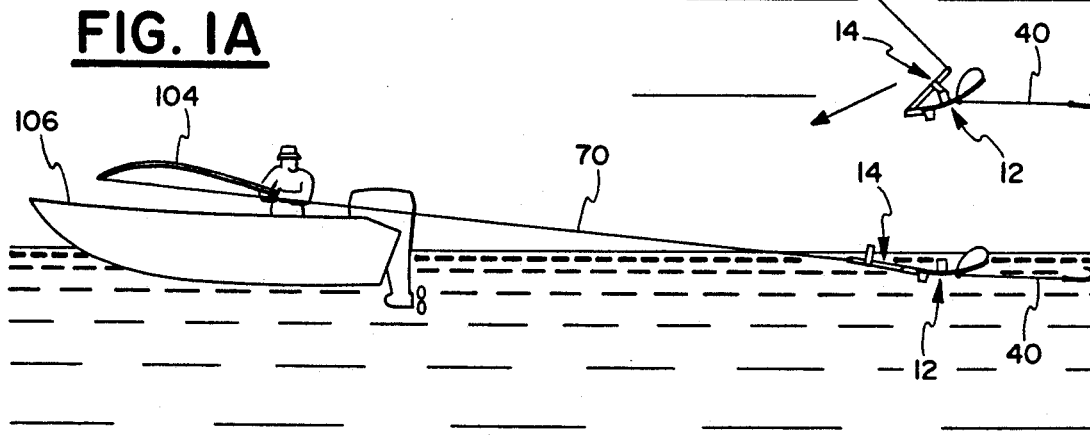
FIG. 1A is a view similar to FIG. 2, showing the sinker in the unset sequence.

To reset the hydrodynamic sinker while in the water, rod 104 is pointed towards the bow of boat 106, as shown in FIG. 1A. At this time, the boat is moving at a trolling speed, the line is taut, and the hydrodynamic sinker is in the unset position.

Figure 2:
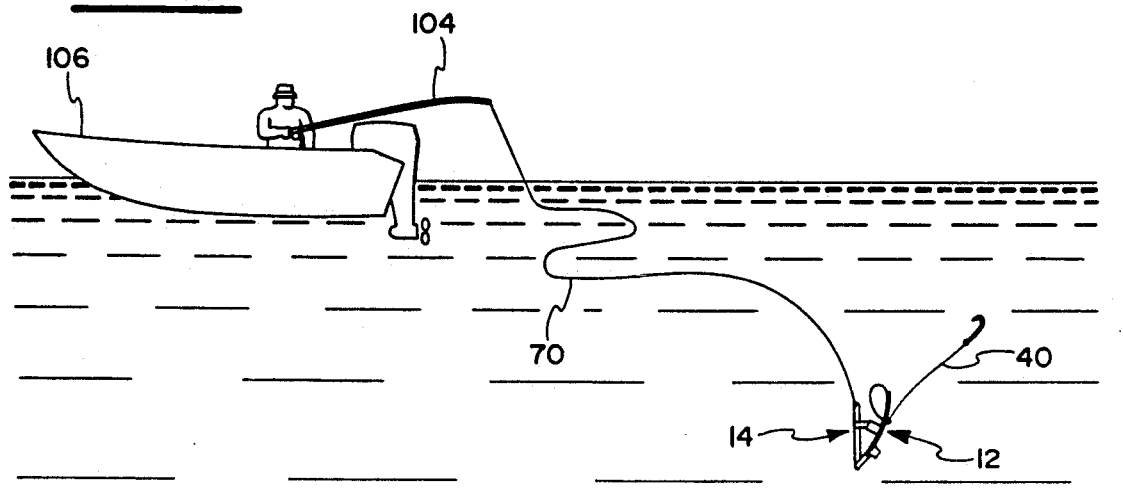
FIG. 2 is a view similar to FIG. 1, showing the hydrodynamic sinker in the set position.

The fisherman next swings rod 104 rearwardly of the boat so that the fishing line 70 becomes slack as shown in FIG. 2. This permits weighted plate member 12 to assume a diving attitude with the forward portion 26 of plate member 12 extending downwardly in the water. At this point, leader 40 is in the upwardly extending position shown in FIG. 2, and fishing line 70 is pulled endwise causing arm 60 to rotate about pivot point 64 in the direction of plate member 12 until the arm is in a nearly vertical position.

Figure 9:
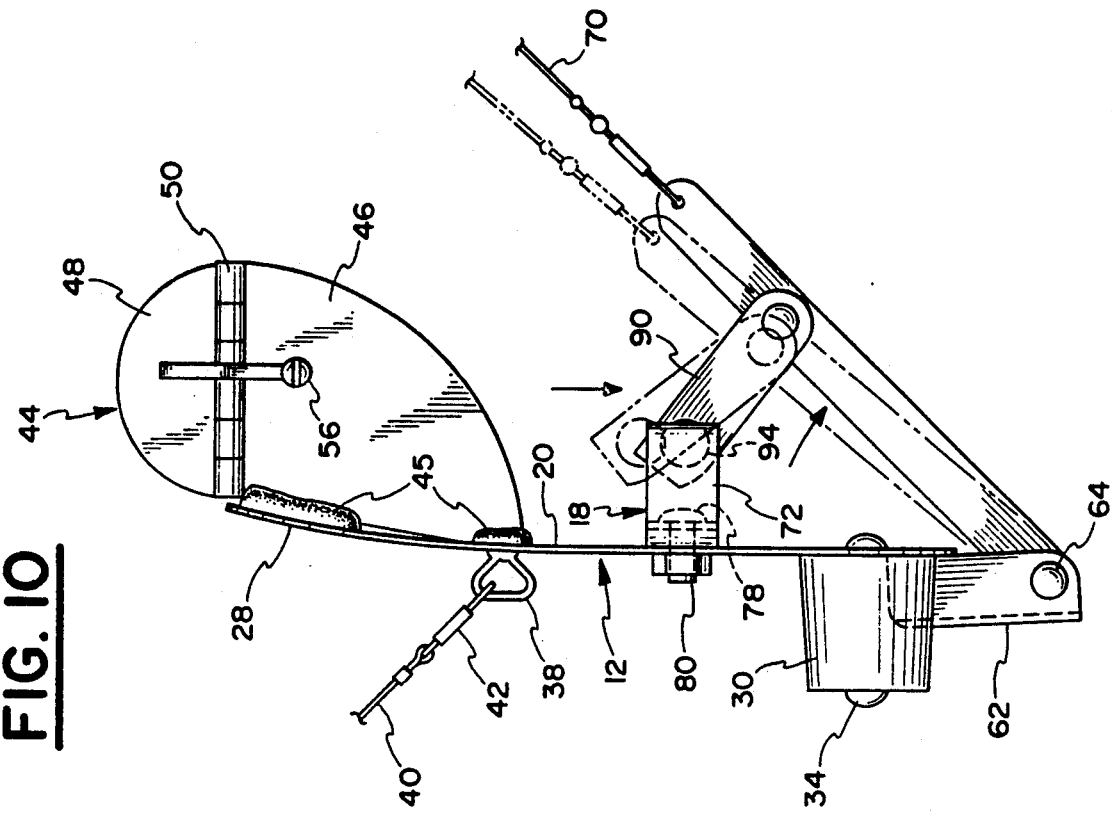
FIG. 9, is a side elevational view of the present invention illustrating the initial steps in positioning the sinker in the set position.

As arm 60 approaches plate member 12, a portion of link 90 extends through the space between flange portions or jaws 82 and 84, and protuberances 94 and 96 extending laterally from link 90 engage the front wall of flange portions 82 and 84, as shown in dotted lines in FIGS. 8 and 9.

Figure 10:
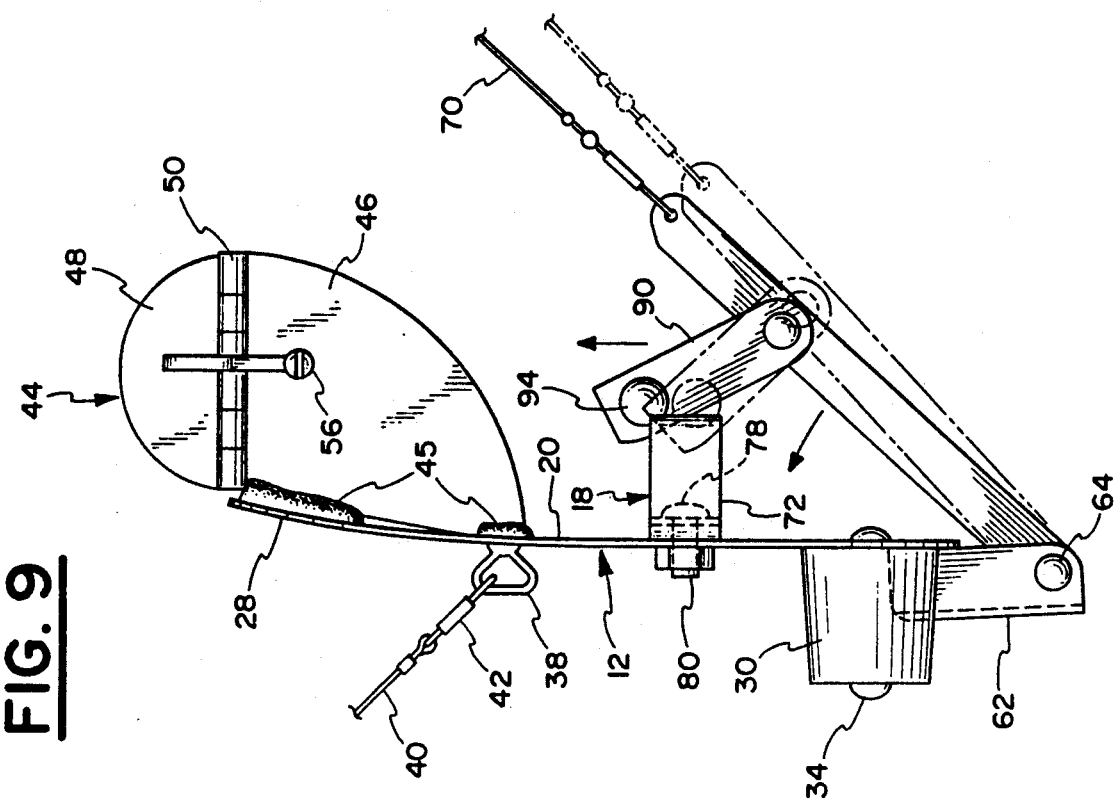
FIG. 10, is a view similar to FIG. 9, illustrating the final steps in positioning the sinker in the set position.

Upon continued movement of arm 60, link 90 and protuberances 94, 96 slide upwardly of the flange portion walls causing pivotal movement of link 90 relative to member 60 against the tension of spring 102, until it reaches the enlarged opening area formed by bevelled portions 86 and 88 of flange portions 82 and 84. At this point, the link and protuberances pass through the enlarged space as illustrated in FIGS. 8, 9, and 10, and protuberances 94 and 96 then move downwardly of the rear walls of flange portions 82 and 84 due to the action of spring 102 on link 90 to force the link to a perpendicular position with respect to arm 60. This action locks arm 60 in the fixed position with respect to plate member 12 and enables the fisherman to troll at the desired depth due to the diving action of the hydrodynamic sinker.

The hydrodynamic sinker remains in the set position until a fish strikes the bait or the fisherman pulls on the fishing line, thereby exerting a force on fishing line 70 which is transferred to latch assembly 18. This force in turn is exerted on protuberances 94 and 96 of link 90 and, due to the resilient characteristics of clip assembly 16, flange portions or jaws 82 and 84 are slightly sprung under this force, enlarging the space between the jaws and, permitting the link to pass therebetween, to automatically move the hydrodynamic sinker to the unset position shown in FIG. 3, to facilitate landing the fish or to inspect the bait.

Optimum results are obtained with the present invention at a trolling speed of about 2 mph using 20# test lines. Unsetting line force to unset the hydrodynamic sinker is about twice the trolling line force and, therefore, a rod which is stiff enough to handle this force should be used.

The hydrodynamic sinker of the present invention affords simple but effective means for setting the device of the present invention in a diving attitude for trolling, which occurs automatically and remains in the set position automatically until automatic release thereof to the unset position when a fish strikes the bait or by fishermen pulling on the line.

While there has been herein shown and described the presently preferred form of the present invention, it is to be understood that such has been done for purposes of illustration only, and that various changes may be made therein within the scope of the appended claims.

What is claimed is:

1. A hydrodynamic sinker for attachment to a fishing line and a leader to which a lure is attached, said sinker comprising:
    a) a plate member having upper and lower surfaces connected to the leader;
    b) weight means connected to one of said surfaces of said plate member for effecting a diving attitude of the plate member in the water;
    c) an arm pivotally connected at one end to said plate member, the opposite end thereof being connected to the fishing line;
    d) said arm being movable towards said plate member as the latter assumes a diving attitude when the line is slack;
    e) clip means fixed to one of said plate member surfaces;
    f) said clip means comprising a pair of spaced, opposed, resilient jaw members having front and rear faces;
    g) latch means carried by said arm, and moving with said arm into locking engagement with said clip means when said arm approaches said plate member;
    h) said latch means comprising a link pivotally engaged with said arm, a first portion of said link extending between said jaw members;
    i) locking means carried by a second position of said link and sequentially engageable with the front and rear faces thereof, said locking means being larger in size than the space between said jaw members to normally prevent passage of said second portion between said jaw members; and,
    j) spring means for normally urging said link into a position substantially at a right angle to said arm, said link pivoting against the tension of said spring as said locking means moves longitudinally of the front faces of said resilient jaw members;
    k) said latch means being disengaged from said clip means under force exerted on said arm by a fish striking the lure or by a fisherman pulling on the fishing line.

2. The hydrodynamic sinker of claim 1, with the addition of:
    a) means for adjusting the distance between said resilient jaw members.

3. The hydrodynamic sinker of claim 1, with the addition of:
    a) stop means on said link for limiting the movement of said link relative to said arm against the tension of said spring means.

4. The hydrodynamic sinker of claim 1, wherein:
    a) said locking means carried by said link comprises an enlarged portion of said link extending laterally thereof, and engageable with the rear faces of said resilient jaw members, to prevent passage thereof through the space between said resilient jaw members, until a strong force is exerted on the link, arm, and leader by a fish striking the lure, or by a fisherman pulling on the fishing line, at which time the jaw members are sprung to permit passage of the locking means through the space.

5. The hydrodynamic sinker of claim 4, wherein:
    a) said locking means comprise protuberances of substantially dome shape.

6. The hydrodynamic sinker of claim 1, with the addition of:
    a) a fin extending upwardly from the upper surface of said plate member and extending longitudinally thereof.

7. The hydrodynamic sinker of claim 6, wherein:
    a) said fin includes a stationary portion and a movable portion hingedly connected to each other, and
    b) means for adjusting the position of said movable portion relative to said stationary portion to control the direction of movement of said sinker while fishing.

8. A hydrodynamic sinker for attachment to a fishing line and a leader to which the lure is attached, said sinker comprising:
    a) an elongated plate member having upper and lower surfaces and forward and aft ends;
    b) an eyelet engaged with the lower surface of said plate member for attachment to the leader;
    c) a fin extending upwardly from the upper surface of said plate member at the aft end thereof, and extending longitudinally thereof;
    d) said fin including a stationary portion and a movable portion;
    e) a first means for hingedly connecting said movable portion to said stationary portion;
    f) a second means for adjusting said movable portion relative to said stationary portion to control the direction of movement of said sinker in the water;
    g) said second means comprising arms fixedly engaged with opposed sides of said movable portion of the fin, and extending in opposed, spaced relation to said stationary portion of the fin;
    h) screw means threadedly engaged with that part of said spaced arms in opposed relation to said stationary portion of the fin, and extending into engagement with said stationary portion of the fin, said screw means being adjustable to effect relative movement of said movable portion with respect to said stationary portion;
    i) weight means affixed to the lower surface of said plate member at the forward end thereof;
    j) an arm, one end of which is pivotally engaged with the forward end of said plate member;
    k) connector means on the opposite end of said arm for joining said arm to the fishing line;
    l) clip means engaged with the upper surface of said plate member;
    m) latch means engaged with said arm;

n) said arm moving in the direction of said plate member as said plate member assumes a diving attitude when the fishing line is slack;

o) a third means for effecting locking engagement of said latch means with said clip means; and, p) a fourth means for releasing said latch means from said clip means under force exerted on said arm by a fish striking the lure or by a fisherman pulling on the fishing line.

9. The hydrodynamic sinker of claim 8, wherein:

a) said plate member is of curvilinear shape.

10. A hydrodynamic sinker for attachment to a fishing line and a leader to which a lure is attached, said sinker comprising:

a) an elongated plate member having upper and lower surfaces and forward and aft ends;

b) an eyelet engaged with the lower surface of said plate member for attachment to the leader;

c) a fin extending upwardly from the upper surface of said plate member at the aft end thereof;

d) weight means affixed to the lower surface of said plate member at the forward end thereof;

e) an arm, one end of which is pivotally engaged with the forward end of said plate member;

f) connector means on the opposite end of said arm for joining said arm to the fishing line;

g) clip means engaged with the upper surface of said plate member;

h) said clip means comprising a pair of jaw members of resilient material having front and rear faces;

i) said jaw members being spaced apart a predetermined distance;

j) latch means engaged with said arm;

k) said latch means comprising a link pivotally engaged with said arm, a first portion of said link being of a thickness to fit through the space between said jaw members;

l) a second portion of said link being enlarged to normally prevent passage of said link between said jaw members;

m) said second portion of said link being movable longitudinally of the front face of said jaw members in response to the pivotal movement of said arm with respect to said plate member;

n) said second portion of said link moving beyond said jaw members and engaging the rear faces of said jaw members by continued movement of said arm in the direction of said plate member, to lockingly engage said link with said jaw members, to located said sinker in the set position;

o) said second portion of said link being pulled between said resilient jaw members under force exerted by fish striking the lure or by a fisherman pulling on the fishing line to move the sinker to the unused portion.

11. The hydrodynamic sinker of claim 10, wherein:

a) said clip means comprises a substantially U-shaped member having a pair of opposed walls joined by a connecting portion, and, b) means for engaging said connecting portion with said plate member.

12. The hydrodynamic sinker of claim 11, wherein:

a) said connecting portion is bowed, and b) said means for engaging said connecting portion with said plate member comprises adjusting means for varying the distance between said bowed connecting portion and said plate member, to vary the distance between said walls.

13. The hydrodynamic sinker of claim 10, with the addition of:

a) spring means engageable with said link for normally biasing the link to a position that is substantially at a right angle to said arm.

14. The hydrodynamic sinker of claim 10, with the addition of:

a) stop means on said link for limiting the movement of said link relative to said arm against the tension of said spring means.

15. The hydrodynamic sinker of claim 10, wherein:

a) said enlarged second portion of said link comprises dome-shaped protuberances extending laterally from opposite sides of said link.

16. A hydrodynamic sinker for attachment to a fishing line and a leader to which a lure is attached, said sinker comprising:

a) a plate member having upper and lower surfaces connected to the leader;

b) weight means connected to one of said surfaces of said plate member for effecting a diving attitude of the plate member in the water;

c) an arm pivotally connected at one end to said plate member, the opposite end thereof being connected to the fishing line;

d) said arm being movable towards said plate member as the latter assumes a diving attitude when the line is slack;

e) clip means having front and rear faces fixed to one of said plate member surfaces;

f) latch means carried by said arm, said latch means moving with said arm into locking engagement with said clip means when said arm approaches said plate member;

g) said latch means including a first member pivotally engaged with said arm and movable longitudinally of said clip means in response to this movement of said arm toward said plate member;

h) a portion of said first member engaging the front face of said clip means; and, i) a second member engageable with said first member for normally urging the latter to a position at substantially a right angle to said arm, said arm pivoting against the force of said second member as said first member moves longitudinally of the front face of said clip means;

j) said second member urging said first member in a second direction after the first member has moved to the limit of the front face of said clip means, for engaging said portion of said first member with the rear face of said clip means to effect locking engagement of said latch means with said clip means; and, k) said latch means being disengaged from said clip means under force exerted on said arm by a fish striking this lure or by a fisherman pulling on this fishing line.

17. The hydrodynamic sinker of claim 16, wherein:

a) said first member comprises a link, one end of which is pivotally engaged with said arm, a portion of the opposite end of said link engaging the front face of said clip means; and b) said second means comprises a spring for normally urging said link to a position at a substantially right angle to said arm.

18. The hydrodynamic sinker of claim 17, wherein:

a) said clip means comprises a pair of spaced, opposed resilient jaw members having front and rear faces.

19. The hydrodynamic sinker of claim 18, wherein:
a) said locking means carried by said link comprises an enlarged portion of said link extending laterally thereof, and engageable with the rear faces of said resilient jaw members, to prevent passage thereof through the space between said resilient jaw members, until a strong force is exerted on the link, arm, and leader by a fish striking the lure, or by a fisherman pulling on the fishing line, at which time the jaw members are sprung to permit passage of the locking means through the space.

20. The hydrodynamic sinker of claim 19, wherein:
a) said locking means comprise protuberances of substantially dome shape.

* * * * *